(12) United States Patent
Hsu et al.

(10) Patent No.: US 12,517,371 B2
(45) Date of Patent: Jan. 6, 2026

(54) OPTICAL SYSTEM

(71) Applicant: TDK TAIWAN CORP., Taoyuan (TW)

(72) Inventors: Chan-Jung Hsu, Taoyuan (TW);
Chen-Hsin Huang, Taoyuan (TW);
Chen-Hung Chao, Taoyuan (TW);
Yi-Ho Chen, Taoyuan (TW); Kun-Shih Lin, Taoyuan (TW); Shou-Jen Liu, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 517 days.

(21) Appl. No.: 17/902,606

(22) Filed: Sep. 2, 2022

(65) Prior Publication Data

US 2023/0266603 A1   Aug. 24, 2023

Related U.S. Application Data

(60) Provisional application No. 63/312,987, filed on Feb. 23, 2022.

(30) Foreign Application Priority Data

Jul. 8, 2022 (CN) .......................... 202210805350.X

(51) Int. Cl.
| | |
|---|---|
| *G02B 27/64* | (2006.01) |
| *G03B 5/04* | (2021.01) |
| *G03B 13/36* | (2021.01) |
| *H02K 41/035* | (2006.01) |

(52) U.S. Cl.
CPC ............. *G02B 27/646* (2013.01); *G03B 5/04* (2013.01); *G03B 13/36* (2013.01); *H02K 41/0354* (2013.01); *G03B 2205/0015* (2013.01); *G03B 2205/0069* (2013.01)

(58) Field of Classification Search
CPC . G03B 30/00; G03B 9/06; G03B 9/22; G03B 9/24; H04M 1/0264
See application file for complete search history.

(56) References Cited

U.S. PATENT DOCUMENTS

| | | | |
|---|---|---|---|
| 2015/0198864 A1* | 7/2015 | Havskjold .............. | H04N 23/51 455/556.1 |
| 2020/0301246 A1* | 9/2020 | Seo ........................ | H04N 23/55 |

FOREIGN PATENT DOCUMENTS

CN        106375503 A  *  2/2017  .......... H04M 1/0264

* cited by examiner

*Primary Examiner* — Noam Reisner
(74) *Attorney, Agent, or Firm* — MUNCY, GEISSLER, OLDS & LOWE, P.C.

(57) ABSTRACT

An optical system is provided and includes a first optical element driving mechanism, which includes a first fixed assembly, a first movable assembly, and a first driving assembly. The first movable assembly is configured to be connected to a first optical element, and the first movable assembly is movable relative to the first fixed assembly. The first movable assembly includes a first movable element and a second movable element. The first driving assembly is configured to drive the first movable assembly to move relative to the first fixed assembly. The first fixed assembly and the first movable assembly are arranged along a main axis, and when viewed along the main axis, a portion of the first movable element overlaps the second movable element.

20 Claims, 16 Drawing Sheets

OPTICAL SYSTEM

CROSS REFERENCE TO RELATED APPLICATIONS

This application claims the benefit of U.S. Provisional Application No. 63/312,987, filed on Feb. 23, 2022, and China Patent Application No. 202210805350.X, filed on Jul. 8, 2022, the entirety of which are incorporated by reference herein.

BACKGROUND OF THE DISCLOSURE

Field of the Disclosure

The present disclosure relates to an optical system, and in particular it relates to an optical system having an aperture structure.

Description of the Related Art

As technology has developed, many of today's electronic devices (such as smartphones) have a camera and video functionality. Using the camera modules disposed in electronic devices, users can use their electronic devices to capture photographs and record videos.

Today's design for electronic devices continues to follow the trend of miniaturization, meaning that the various components of the camera module and its structure must also be continuously reduced, so as to achieve miniaturization. In general, the driving mechanism in the camera module has a camera lens holder configured to hold a camera lens, and the driving mechanism can have the functions of auto focusing or optical image stabilization. In addition, the camera module can also be equipped with an aperture mechanism to adjust the amount of light. However, although the existing driving mechanism can achieve the aforementioned functions of taking photographs and recording video, they still cannot meet all of the users' needs.

Therefore, how to design a camera module that can perform auto-focus, optical anti-shake, adjust the amount of light and achieve miniaturization at the same time are topics nowadays that need to be discussed and solved.

BRIEF SUMMARY OF THE DISCLOSURE

Accordingly, one objective of the present disclosure is to provide an optical system to solve the above problems.

According to some embodiments of the disclosure, an optical system is provided and includes a first optical element driving mechanism, which includes a first fixed assembly, a first movable assembly, and a first driving assembly. The first movable assembly is configured to be connected to a first optical element, and the first movable assembly is movable relative to the first fixed assembly. The first movable assembly includes a first movable element and a second movable element. The first driving assembly is configured to drive the first movable assembly to move relative to the first fixed assembly. The first fixed assembly and the first movable assembly are arranged along a main axis, and when viewed along the main axis, a portion of the first movable element overlaps the second movable element.

According to some embodiments, the optical system further includes a second optical element driving mechanism. The first optical element driving mechanism is disposed on the second optical element driving mechanism. The second optical element driving mechanism includes a second fixed assembly, a second movable assembly and a second driving assembly. A second movable assembly is configured to be connected to a second optical element. A second driving assembly is configured to drive the second movable assembly and the second optical element to move relative to the second fixed assembly.

According to some embodiments, the second fixed assembly includes a casing and a second base. The casing is affixed to the second base to form an accommodation space. The accommodation space is configured to accommodate the second movable assembly and the second driving assembly. The casing surrounds a portion of the first optical element driving mechanism. The first movable element is rotatable around the main axis. The second movable element is movable along a first axis. The first axis is perpendicular to the main axis.

According to some embodiments, the optical system is configured to be mounted on a chassis of an electronic device along a second axis. The second axis is parallel to the main axis. The second axis is perpendicular to the first axis. The first optical element driving mechanism further includes a protecting cover configured to cover the casing. The protecting cover is connected to the casing.

According to some embodiments, the protecting cover is welded or adhered to the casing. The chassis has an outer opening, and the protecting cover is inserted into the outer opening.

According to some embodiments, when viewed along the first axis, the chassis overlaps a portion of the protecting cover. When viewed along the first axis, the chassis overlaps a portion of the first optical element driving mechanism. When viewed along the first axis, the chassis does not overlap the casing. When viewed along the first axis, the casing overlaps a portion of the protecting cover.

According to some embodiments, the optical system further includes a cushion disposed between the chassis and the casing. The cushion includes a sponge.

According to some embodiments, the second movable assembly has a receiving trench extending along the first axis. The second movable element is disposed in the receiving trench. The second movable element is configured to move along the first axis in the receiving trench. The second movable assembly further includes at least three receiving grooves, extending along the first axis. The first optical element driving mechanism further includes a second rolling assembly disposed between the second movable element and the second movable assembly. The second rolling assembly includes at least three second rolling elements, which are respectively disposed in the at least three receiving grooves. The second movable element moves along the first axis relative to the second movable assembly by the second rolling elements.

According to some embodiments, when viewed along the main axis, the second rolling elements form a triangle. The triangle is an isosceles triangle. The first driving assembly includes two first magnetic elements fixedly disposed on the second movable element. The two first magnetic elements are arranged along the first axis. The first magnetic element includes a first N-pole and a first S-pole. The first N-pole and the first S-pole are arranged along the first axis.

According to some embodiments, the second optical element driving mechanism further includes a magnetic member disposed in the receiving trench. In the second axis, the second movable element is located between the two first magnetic elements and the magnetic member. A magnetic attraction force is generated between the two first magnetic elements and the magnetic member, so that the second movable element does not separate from the receiving trench.

According to some embodiments, the second movable assembly includes a second frame and an intermediate bracket. The second optical element driving mechanism further includes a third rolling assembly. The second frame is moved along a third axis relative to the intermediate bracket by the third rolling assembly. The intermediate bracket and the second frame are moved along the first axis relative to the second base by the third rolling assembly. The third axis is perpendicular to the first axis and the second axis.

According to some embodiments, the second driving assembly includes two second magnetic elements and a third magnetic element, fixedly disposed on the second frame. The two second magnetic elements are arranged along the first axis. The second magnetic element has a second N-pole and a second S-pole. The second N-pole and the second S-pole are arranged along the second axis. The third magnetic element has a third N-pole and a third S-pole. The third N-pole and the third S-pole are arranged along the third axis. The third magnetic element is disposed on a first side of the optical system. The intermediate bracket has an L-shaped structure. When viewed along the second axis, the third magnetic element does not overlap the intermediate bracket.

According to some embodiments, the two first magnetic elements, the magnetic member and the third magnetic element are arranged along the second axis. When viewed along the third axis, the magnetic member is located between the two first magnetic elements and the third magnetic element. When viewed along the second axis, the two first magnetic elements overlap at least a portion of the magnetic member. When viewed along the second axis, the two first magnetic elements completely overlap the magnetic member.

According to some embodiments, the first optical driving mechanism further includes a first circuit assembly fixedly disposed on the casing. When viewed along the third axis, the first circuit assembly has an L-shaped structure. The first driving assembly further includes two first coils corresponding to the two first magnetic elements. The two first coils are fixedly disposed on the first circuit assembly. The two first coils are arranged along the first axis. When viewed along the second axis, the two first coils overlap the second frame.

According to some embodiments, the second optical element driving mechanism further includes a holder, a first elastic element and a second elastic element. The holder is configured to hold the second optical element. The holder is suspended in the second frame by the first elastic element and the second elastic element. When viewed along the second axis, the holder has a polygonal structure.

According to some embodiments, when viewed along the second axis, the holder has a protruding structure which protrudes from a side of the polygonal structure. An avoiding groove corresponding to the protruding structure is formed on the second frame. The protruding structure is disposed in the avoiding groove. When viewed along the second axis, the protruding structure overlaps the avoiding groove. The size of the avoiding groove is larger than the size of the protruding structure.

According to some embodiments, the second optical driving mechanism further includes a second circuit assembly electrically connected to the second driving assembly. The second circuit assembly includes a substrate and a second circuit element. The second circuit element includes a first extending portion, a second extending portion, a third extending portion, a curved portion and a second contact portion. The first extending portion extends from the substrate along the second axis. The second extending portion is connected to the first extending portion. The second extending portion is connected to the third extending portion. Extending directions of the second extending portion and the third extending portion are different. The curved portion is connected between the second contact portion and the third extending portion. An extending direction of the curved portion is different from an extending direction of the second contact portion and the third extending portion.

According to some embodiments, the second extending portion is not in contact with a first sidewall of the second frame. The third extending portion is not in contact with a rear sidewall of the second frame. A portion of the curved portion is not in contact with the rear sidewall. The second contact portion is in contact with the rear sidewall. A second slot is formed on the rear sidewall, and a portion of the second contact portion is inserted into the second slot.

According to some embodiments, a second position sensing element is disposed on the second contact portion. The second position sensing element is electrically connected to the second contact portion. When viewed along the main axis, the second position sensing element overlaps the second frame.

According to some embodiments, a sensing magnet is disposed in the protruding structure of the holder, and the sensing magnet corresponds to the second position sensing element. When viewed along the main axis, the shortest distance between the second position sensing element and the side of the holder is greater than the shortest distance between the second position sensing element and the sensing magnet. When viewed along the main axis, the distance between the sensing magnet and the second contact portion in the third axis is less than the distance between the sensing magnet and the third extending portion in the third axis.

The present disclosure provides an optical system including a first optical element driving mechanism and a second optical element driving mechanism. The first optical element driving mechanism may serve as an aperture mechanism, configured to adjust the amount of light entering the optical system. The second optical element driving mechanism can achieve the functions of auto-focusing (AF) and optical image stabilization (OIS).

In some embodiments, when the second movable element is driven to move along the first axis, the driving member is configured to be in contact with the clamping portion to drive the first movable element to rotate around the main axis, thereby drive the first optical elements to adjust the size of the aperture. It is worth noting that, the second movable element is disposed in the second frame of the second optical element driving mechanism, so the purpose of miniaturization can be achieved. Furthermore, based on the configurations of the second movable element, the driving member and the first movable element, the size of the aperture of the first optical element driving mechanism can be continuously changed.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations pointed out in the appended claims. These and other features of the disclosure will become more fully apparent from the following description and appended claims, or can be learned by the practice of the principles set forth herein.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF THE ILLUSTRATIVE EMBODIMENTS

Figure 1:
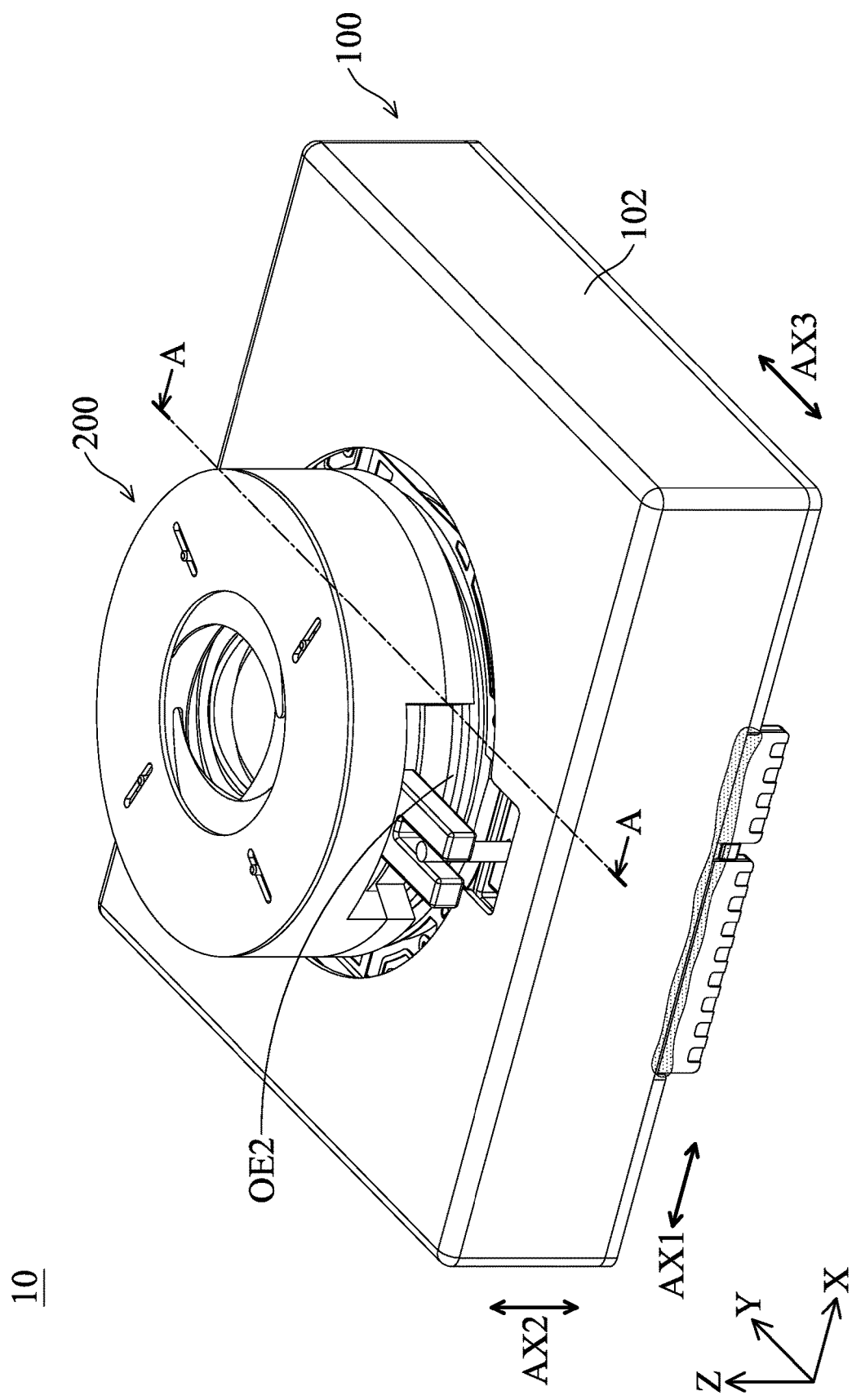
FIG. 1 is a schematic diagram of an optical system 10 according to an embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Figure 2:
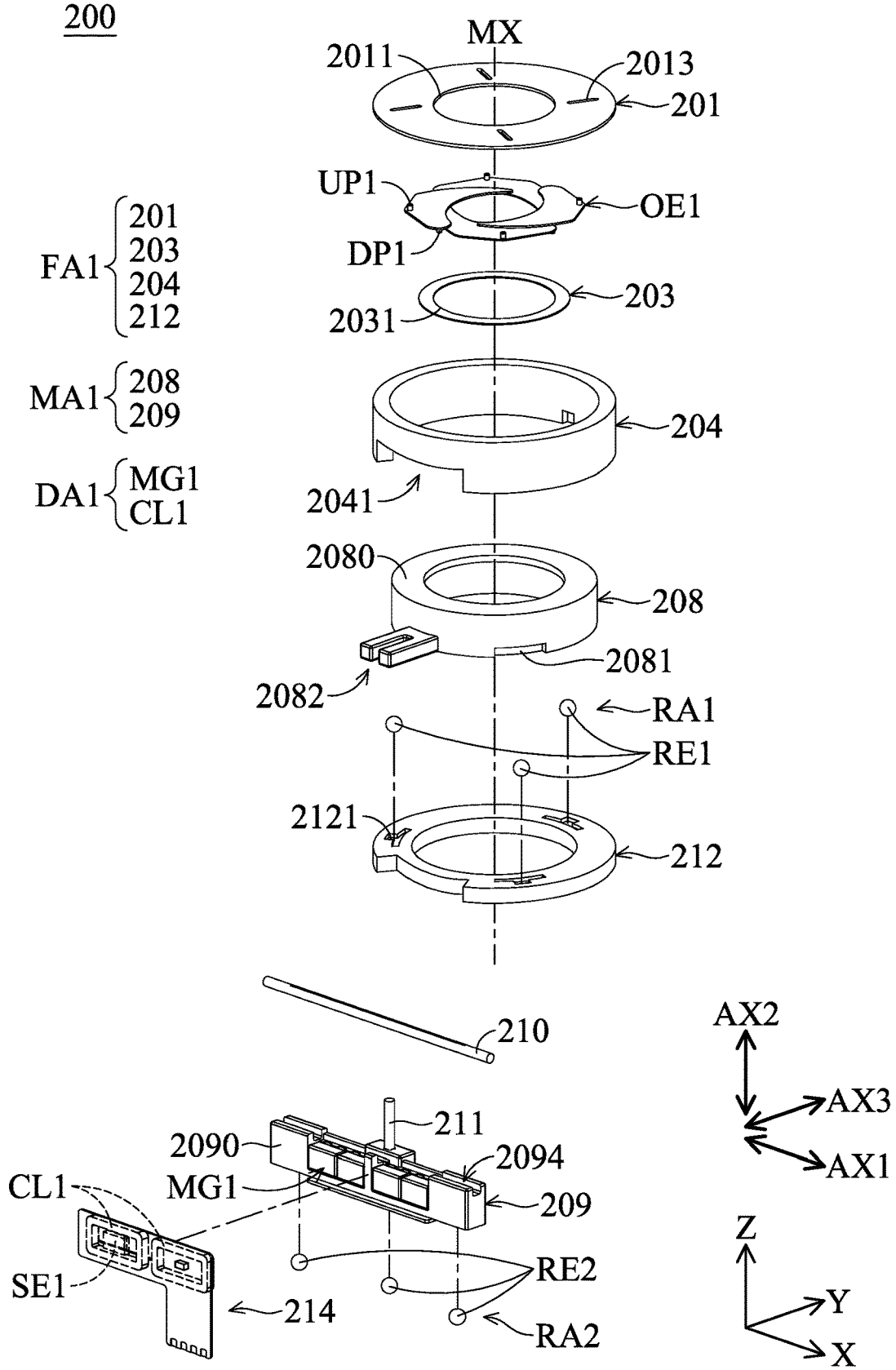
FIG. 2 is an exploded diagram of a first optical element driving mechanism 200 according to an embodiment of the present disclosure.
Figure 3:
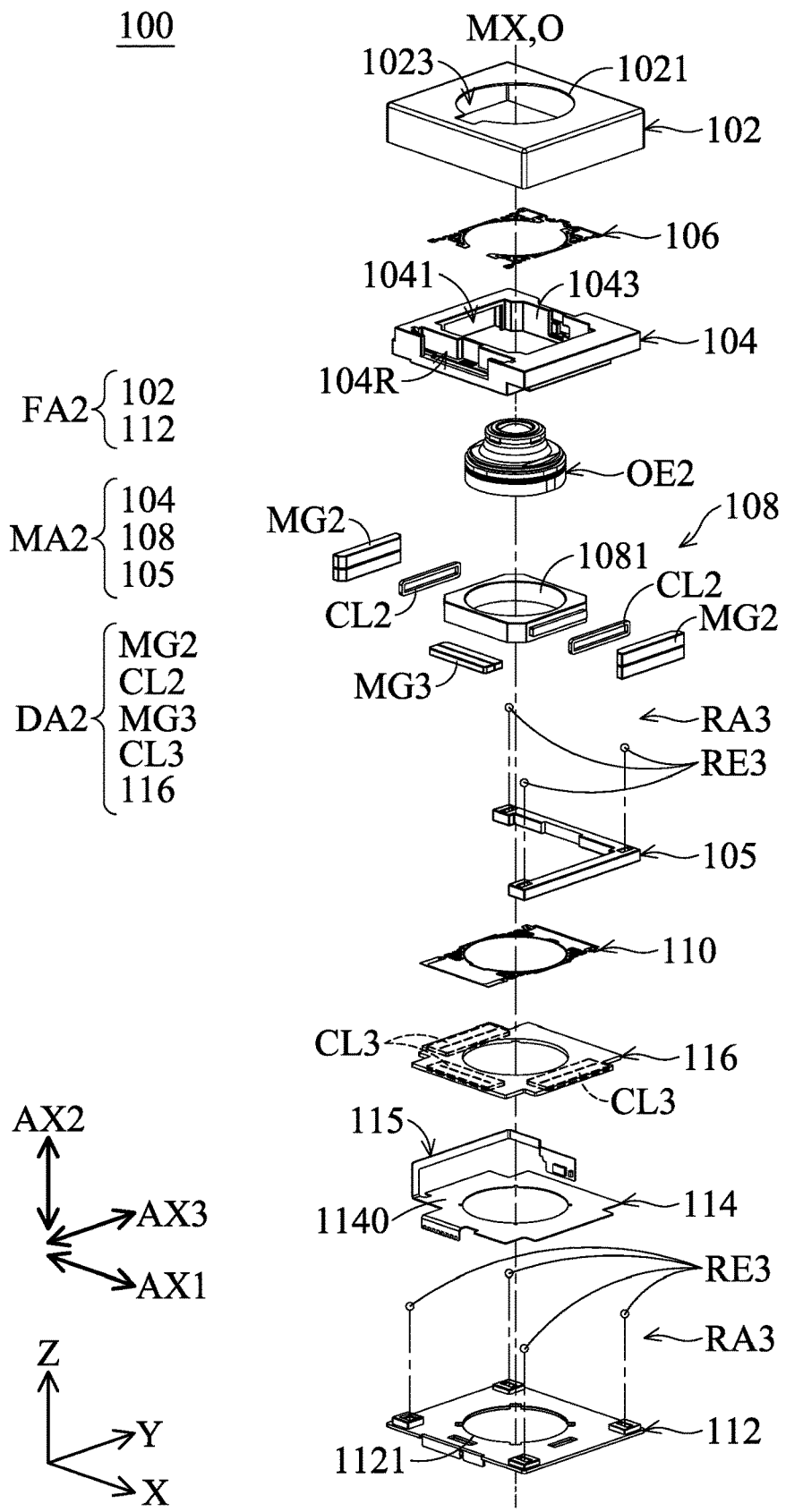
FIG. 3 is an exploded diagram of a second optical element driving mechanism 100 according to an embodiment of the present disclosure.

Please refer to FIG. 1 to FIG. 3. FIG. 1 is a schematic diagram of an optical system 10 according to an embodiment of the present disclosure, FIG. 2 is an exploded diagram of a first optical element driving mechanism 200 according to an embodiment of the present disclosure, and FIG. 3 is an exploded diagram of a second optical element driving mechanism 100 according to an embodiment of the present disclosure. The optical system 10 can be an optical camera system and can be configured to hold and drive an optical element. The optical system 10 can be installed in various electronic devices or portable electronic devices, such as a smartphone, for allowing a user to perform the image capturing function. In this embodiment, the optical system 10 can be a voice coil motor (VCM) with an auto-focusing (AF) function, but it is not limited thereto. In other embodiments, the optical system 10 can also perform the functions of auto-focusing and optical image stabilization (OIS).

In this embodiment, the optical system 10 may include the first optical element driving mechanism 200 and the second optical element driving mechanism 100. The first optical element driving mechanism 200 may serve as an aperture mechanism, configured to adjust the amount of light entering the optical system 10. The second optical element driving mechanism 100 can be the aforementioned voice coil motor, so that the optical system 10 can have auto focus (AF) and optical anti-shake (OIS) functions. In this embodiment, the first optical element driving mechanism 200 is disposed on the second optical element driving mechanism 100.

The first optical element driving mechanism 200 includes a first fixed assembly FA1, a first movable assembly MA1, and a first driving assembly DA1. The first movable assembly MA1 is configured to be connected to at least one first optical element OE1, and the first movable assembly MA1 is movable relative to the first fixed assembly FA1. The first movable assembly MA1 may include a first movable element 208 and a second movable element 209. The first driving assembly DA1 is configured to drive the first movable assembly MA1 to move relative to the first fixed assembly FA1.

As shown in FIG. 2, the first fixed assembly FA1 and the first movable assembly MA1 are arranged along a main axis MX, and the first driving assembly DA1 is configured to drive the second movable element 209 to move along a first axis AX1 (the X-axis), thereby driving the first movable element 208 to move around the main axis MX. The first axis AX1 is perpendicular to the main axis MX.

The first fixed assembly FA1 may include an outer shielding member 201, an inner shielding member 203, a first frame 204 and a first base 212. The first frame 204 is affixed to the first base 212, the outer shielding member 201 is affixed to the first frame 204, and the first frame 204 is located between the outer shielding member 201 and the first base 212. The inner shielding member 203 is disposed between the outer shielding member 201 and the first movable element 208. For example, the inner shielding member 203 can be disposed on the first movable element 208 or the first frame 204.

When viewed along the main axis MX, the outer shielding member 201 has a ring structure and a first outer opening 2011. When viewed along the main axis MX, the inner shielding member 203 has a ring structure and a first inner opening 2031. The maximum size of the first outer opening 2011 is different from the maximum size of the first inner opening 2031. For example, the maximum size of the first outer opening 2011 is greater than the maximum size of the first inner opening 2031.

Furthermore, the first movable element 208 is disposed in the first frame 204, and the first movable element 208 is rotatable around the main axis MX relative to the first frame 204. Specifically, the first optical element driving mechanism 200 may further include a first rolling assembly RA1 disposed between the first movable element 208 and the first base 212.

In this embodiment, the first rolling assembly RA1 includes at least three first rolling elements RE1. The first rolling element RE1 is, for example, a sphere, and is disposed in a groove 2121 of the first base 212 and in a groove 2081 of the first movable element 208, so that the first movable element 208 rotates around the main axis MX relative to the first base 212 and the first frame 204 by these first rolling elements RE1.

In this embodiment, the first optical element driving mechanism 200 may include four first optical elements OE1, which are movably connected to the first movable element 208. The number of the first optical element OE1 is not limited to this embodiment. When the first movable element 208 rotates around the main axis MX, the first optical element OE1 can move relative to the first fixed assembly FA1 and the first movable assembly MA1, thereby adjusting the amount of external light entering the first optical element driving mechanism 200 from the exterior.

Specifically, four first guiding grooves 2013 are formed on the outer shielding member 201, and each first optical element OE1 has a first upper protruding pillar UP1 and a first lower protruding pillar DP1. When viewed along the main axis MX, the first upper protruding pillar UP1 does not overlap the first lower protruding pillar DP1.

The first lower protruding pillar DP1 is configured to insert the first movable element 208, and the first guiding groove 2013 is configured to accommodate the corresponding first upper protruding pillar UP1. When the first movable element 208 rotates around the main axis MX, the first optical element OE1 rotates around the first lower protruding pillar DP1, and the first upper protruding pillar UP1 is configured to move along the first guiding groove 2013, so that the first optical element OE1 selectively blocks the first inner opening 2031.

It is worth noting that when viewed along the main axis MX, the extending direction of the first guiding groove 2013 deviates from the center (the main axis MX) of the outer shielding member 201.

Furthermore, the second movable element 209 is disposed in a second frame 104 of a second movable assembly MA2 of the second optical element driving mechanism 100. Specifically, the second frame 104 has a receiving trench 104R extending along the first axis AX1, and the second movable element 209 is disposed in the receiving trench 104R. The second movable element 209 is configured to move along the first axis AX1 within the receiving trench 104R.

As shown in FIG. 2, the first optical element driving mechanism 200 further includes a driving member 211 which is affixed to the second movable element 209. The driving member 211 has a cylindrical structure and extends along a second axis AX2 (the Z-axis). The second axis AX2 is perpendicular to the first axis AX1, and the second axis AX2 is parallel to the main axis MX.

The first movable element 208 has a first body 2080 and a clamping portion 2082. When viewed along the main axis MX, the clamping portion 2082 has a U-shaped structure. The clamping portion 2082 extends radially from the first body 2080, and the clamping portion 2082 is configured to clamp the driving member 211.

When the second movable element 209 moves along the first axis AX1, the driving member 211 is configured to be in contact with the clamping portion 2082 to drive the first movable element 208 to rotate around the main axis MX, thereby driving the first optical elements OE1 to selectively block the first inner opening 2031.

In this embodiment, the first body 2080 has a plastic material, the clamping portion 2082 has a plastic material and a metal material, and the plastic material covers the metal material. Specifically, the metal material can have a U-shaped structure, and is embedded in the plastic material by insert molding technology.

As shown in FIG. 2, the first frame 204 has an arc opening 2041, and the clamping portion 2082 is exposed from the arc opening 2041. It is worth noting that the angle of the arc opening 2041 is greater than the limit movement angle (the maximum angle of movement) of the first movable element 208.

Next, as shown in FIG. 3, the second optical element driving mechanism 100 includes a second fixed assembly FA2, a second movable assembly MA2 and a second driving assembly DA2. The second movable assembly MA2 is configured to be connected to a second optical element OE2. The second driving assembly DA2 is configured to drive the second movable assembly MA2 and the second optical element OE2 to move relative to the second fixed assembly FA2.

The second fixed assembly FA2 includes a casing 102 and a second base 112. The casing 102 is affixed to the second base 112 to form an accommodation space 1023, and the accommodation space 1023 is configured to accommodate the second movable assembly MA2 and the second driving assembly DA2. Additionally, as shown in FIG. 1, the casing 102 may surround a portion of the first optical element driving mechanism 200.

Furthermore, in this embodiment, the second movable assembly MA2 may include a second frame 104, a holder 108 and an intermediate bracket 105. The holder 108 is configured to hold the second optical element OE2.

As shown in FIG. 3, the aforementioned casing 102 has a hollow structure, and a casing opening 1021 is formed thereon, and a base opening 1121 is formed on the second base 112. The center of the casing opening 1021 corresponds to an optical axis O of the second optical element OE2 held by the holder 108, and the base opening 1121 corresponds to an image sensing element (not shown) disposed under the second base 112.

As shown in FIG. 3, the holder 108 has a hollow annular structure, and has a through hole 1081. The through hole 1081 forms a threaded structure (not shown) corresponding to another threaded structure (not shown) on the second optical element OE2, such that the second optical element OE2 can be locked in the through hole 1081. Furthermore, the second driving assembly DA2 may include two second coils CL2 disposed on the holder 108.

In this embodiment, the second driving assembly DA2 may further include two second magnetic elements MG2 and a third magnetic element MG3. The second frame 104 has a plurality of grooves 1041 and a central opening 1043. In this embodiment, the second frame 104 has three grooves 1041 for accommodating the aforementioned second magnetic elements MG2 and third magnetic element MG3, but the number of grooves 1041 and magnetic elements is not limited to this embodiment. The holder 108 and the aforementioned second optical element OE2 are disposed in the central opening 1043 and can move relative to the second frame 104.

Furthermore, the second driving assembly DA2 may further include a circuit board 116. The circuit board 116 has three third coils CL3 disposed therein. The number of the third coils CL3 is not limited to this embodiment. The second optical element driving mechanism 100 further includes a second circuit assembly 114 electrically connected to the second driving assembly DA2. Specifically, the second circuit assembly 114 is electrically connected to the circuit board 116 and an external control circuit, and the external control circuit can control the third coils CL3 to be turned on or off.

In this embodiment, the optical system 10 may further include a first elastic element 106 and a second elastic element 110, and the holder 108 may be connected to the second frame 104 through the first elastic element 106 and the second elastic element 110 to be suspended in the central opening 1043. When the second coils CL2 are energized, the two second magnetic elements MG2 act with the second coils CL2 to generate an electromagnetic driving force, thereby driving the holder 108 to move along the optical axis O (the Z-axis) relative to the second frame 104 to perform the auto focusing function.

As shown in FIG. 3, the second optical element driving mechanism 100 may further include a third rolling assembly RA3. The third rolling assembly RA3 may include seven third rolling elements RE3 (balls). three of the third rolling elements RE3 are disposed between the second frame 104 and the intermediate bracket 105, other three third rolling elements RE3 are disposed between the intermediate bracket 105 and the second base 112, and the last third rolling element RE3 is disposed between the second frame 104 and the second base 112.

Therefore, the second frame 104 can move along a third axis AX3 (the Y-axis) relative to the intermediate bracket 105 by the third rolling assembly RA3, and the intermediate bracket 105 and the second frame 104 can move along the first axis AX1 relative to the second base 112 by the third rolling assembly RA3. The third axis AX3 is perpendicular to the first axis AX1 and the second axis AX2.

When the third coils CL3 are energized and are induced with the corresponding second magnetic elements MG2 and the third magnetic element MG3, an electromagnetic driving force is generated to drive the second frame 104 to drive the holder 108 to move along the Y-axis or along the X-axis. Therefore, when the optical system 10 is shaken, the holder 108 can be driven by the aforementioned electromagnetic driving force to move on the X-Y plane, so as to achieve the purpose of optical image stabilization.

Figure 4:
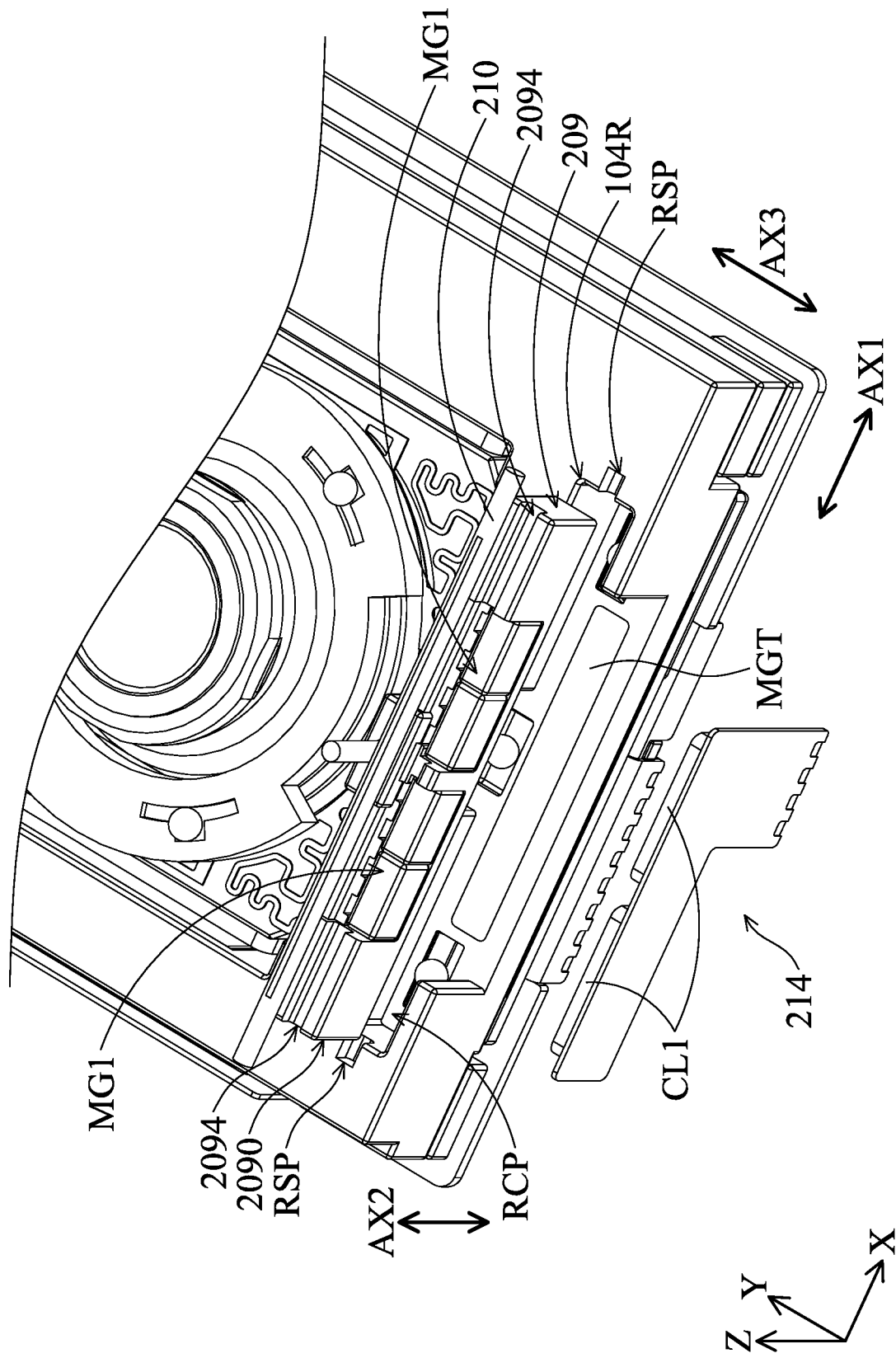
FIG. 4 is a perspective view of a partial structure of the optical system 10 according to an embodiment of the present disclosure.
Figure 5:
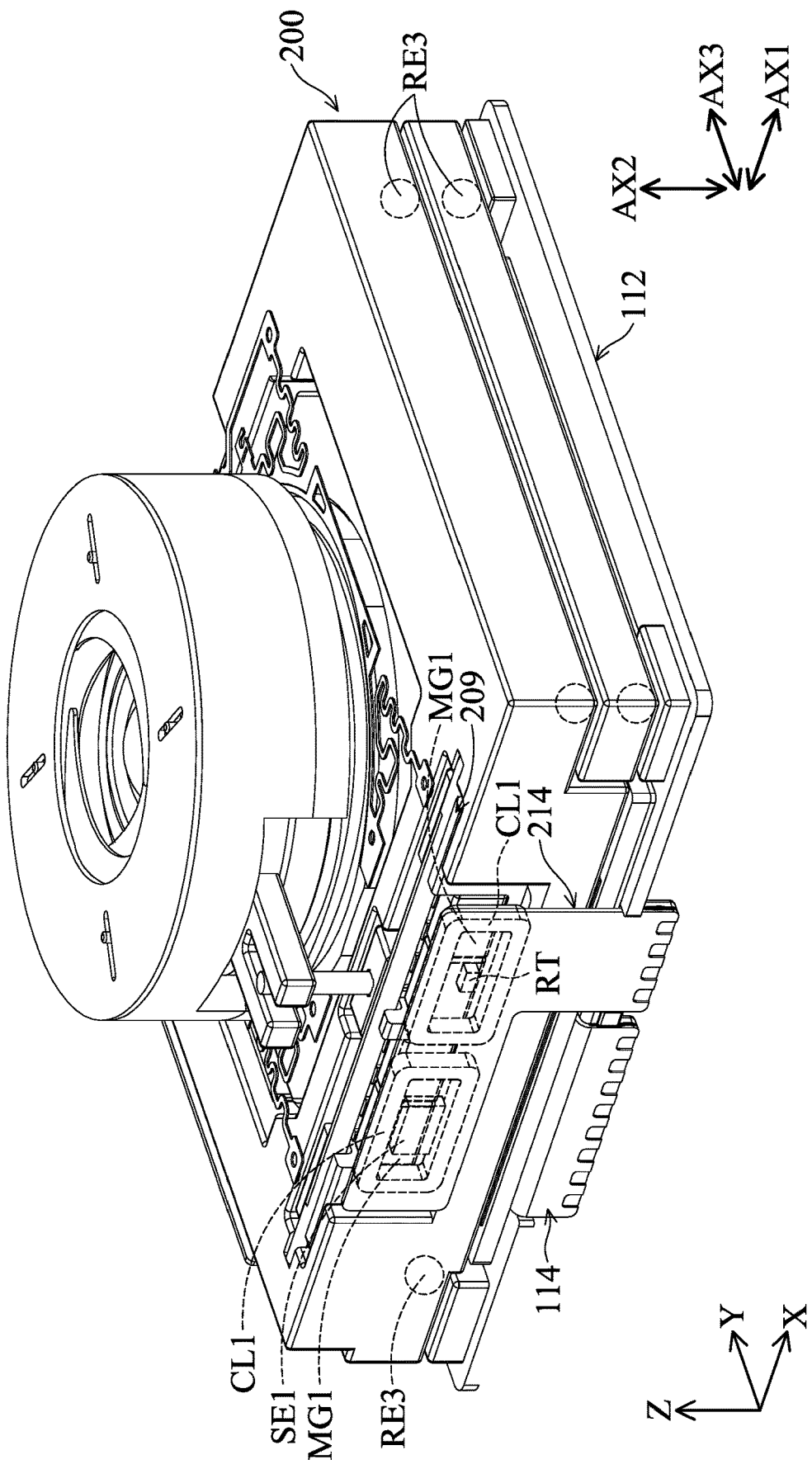
FIG. 5 is a perspective view of the optical system 10 after removing the casing 102 according to an embodiment of the present disclosure.
Figure 6:
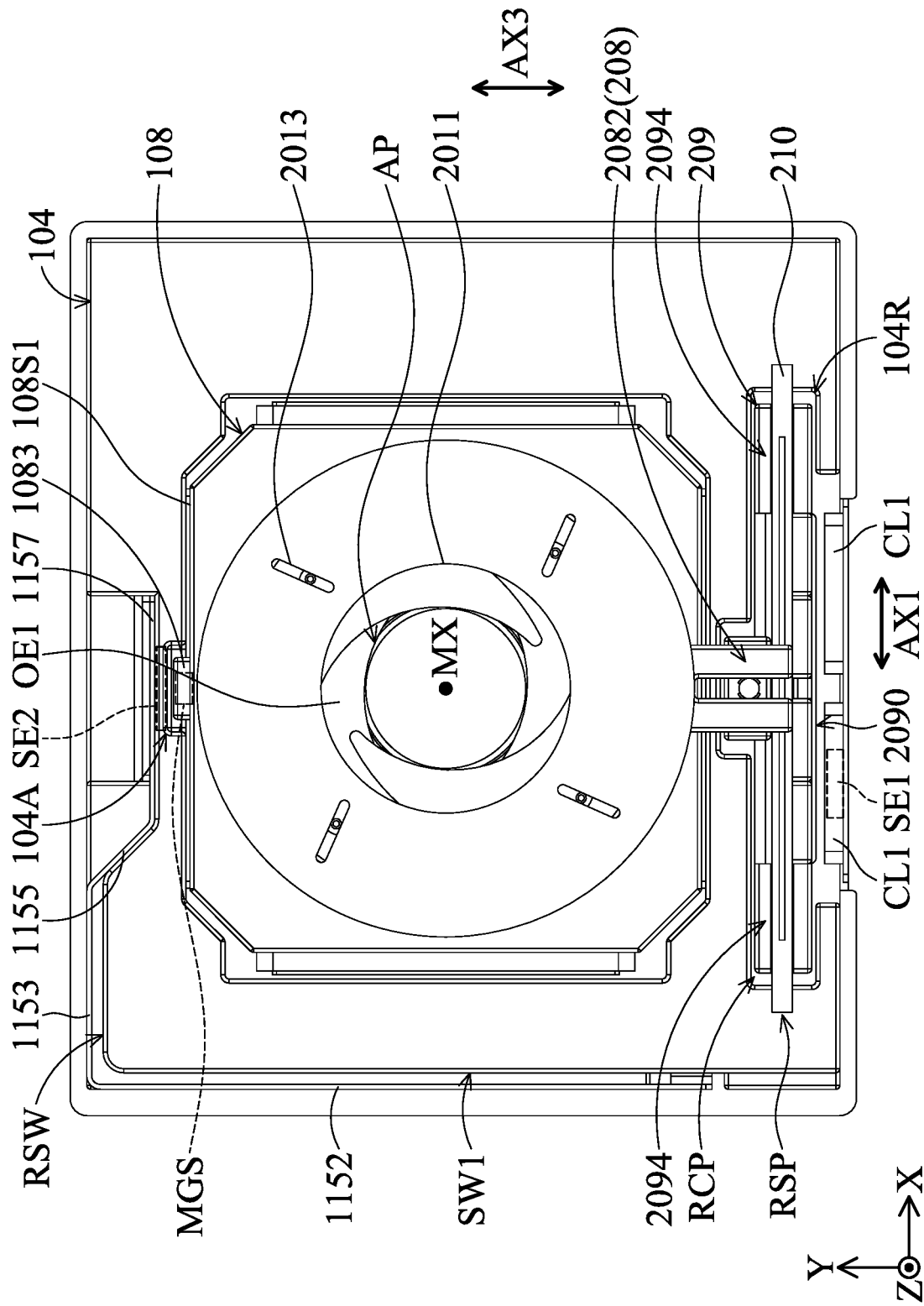
FIG. 6 is a top view of a partial structure of the optical system 10 according to an embodiment of the present disclosure.

Please refer to FIG. 2 to FIG. 6. FIG. 4 is a perspective view of a partial structure of the optical system 10 according to an embodiment of the present disclosure, FIG. 5 is a perspective view of the optical system 10 after removing the casing 102 according to an embodiment of the present disclosure, and FIG. 6 is a top view of a partial structure of the optical system 10 according to an embodiment of the present disclosure. As shown in FIG. 6, when viewed along the main axis MX, a portion of the first movable element 208 overlaps the second movable element 209.

As shown in FIG. 5, the first optical element driving mechanism 200 further includes a first circuit assembly 214 (such as a circuit board), which is fixedly disposed on the casing 102. When viewed along the third axis AX3, the first circuit assembly 214 has an L-shaped structure. Furthermore, the first driving assembly DA1 includes two first magnetic elements MG1 fixedly disposed on the second movable element 209, and the two first magnetic elements MG1 are arranged along the first axis AX1. In this embodiment, the first magnetic elements MG1, the second magnetic elements MG2 and the third magnetic element MG3 can be magnets, but they are not limited thereto.

The second optical element driving mechanism 100 further includes a magnetic member MGT disposed in the receiving trench 104R. In the second axis AX2, a portion of the second movable element 209 is located between the two first magnetic elements MG1 and the magnetic member MGT. A magnetic attraction force is generated between the two first magnetic elements MG1 and the magnetic member MGT, so that the second movable element 209 does not separate from the receiving trench 104R.

The first driving assembly DA1 further includes two first coils CL1 corresponding to the two first magnetic elements MG1 respectively. The two first coils CL1 are fixedly disposed on the first circuit assembly 214, and the two first coils CL1 are arranged along the first axis AX1. When viewed along the second axis AX2, the two first coils CL1 overlap the second frame 104, and when viewed along the third axis AX3, the two first coils CL1 are completely covered by the first circuit assembly 214. When the two first coils CL1 are energized, the two first coils CL1 can act with the first magnetic elements MG1 to generate an electromagnetic driving force to drive the second movable element 209 to move along the first axis AX1.

Figure 7:
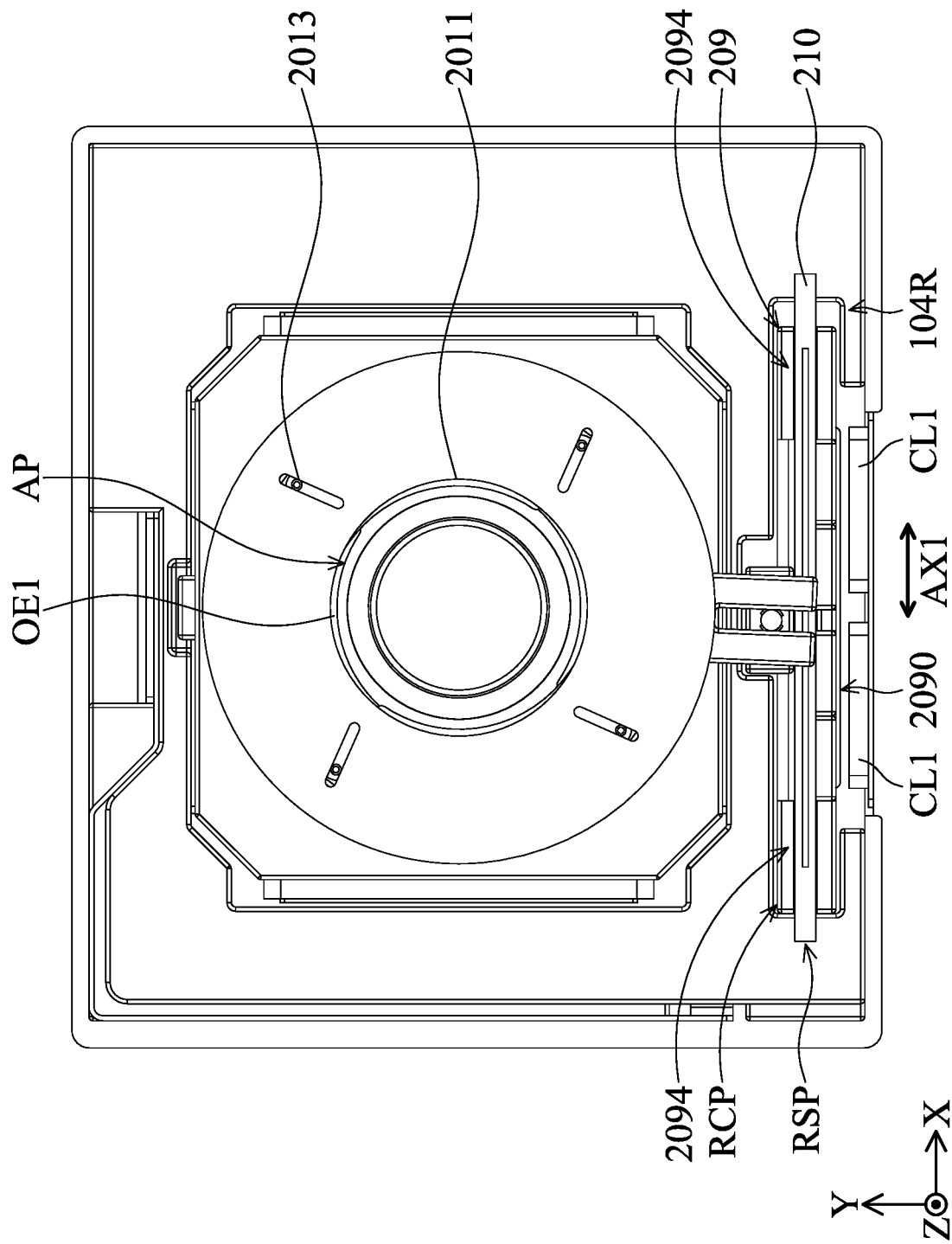
FIG. 7 is a top view of the second movable element 209 in a first extreme position according to an embodiment of the present disclosure.
Figure 8:
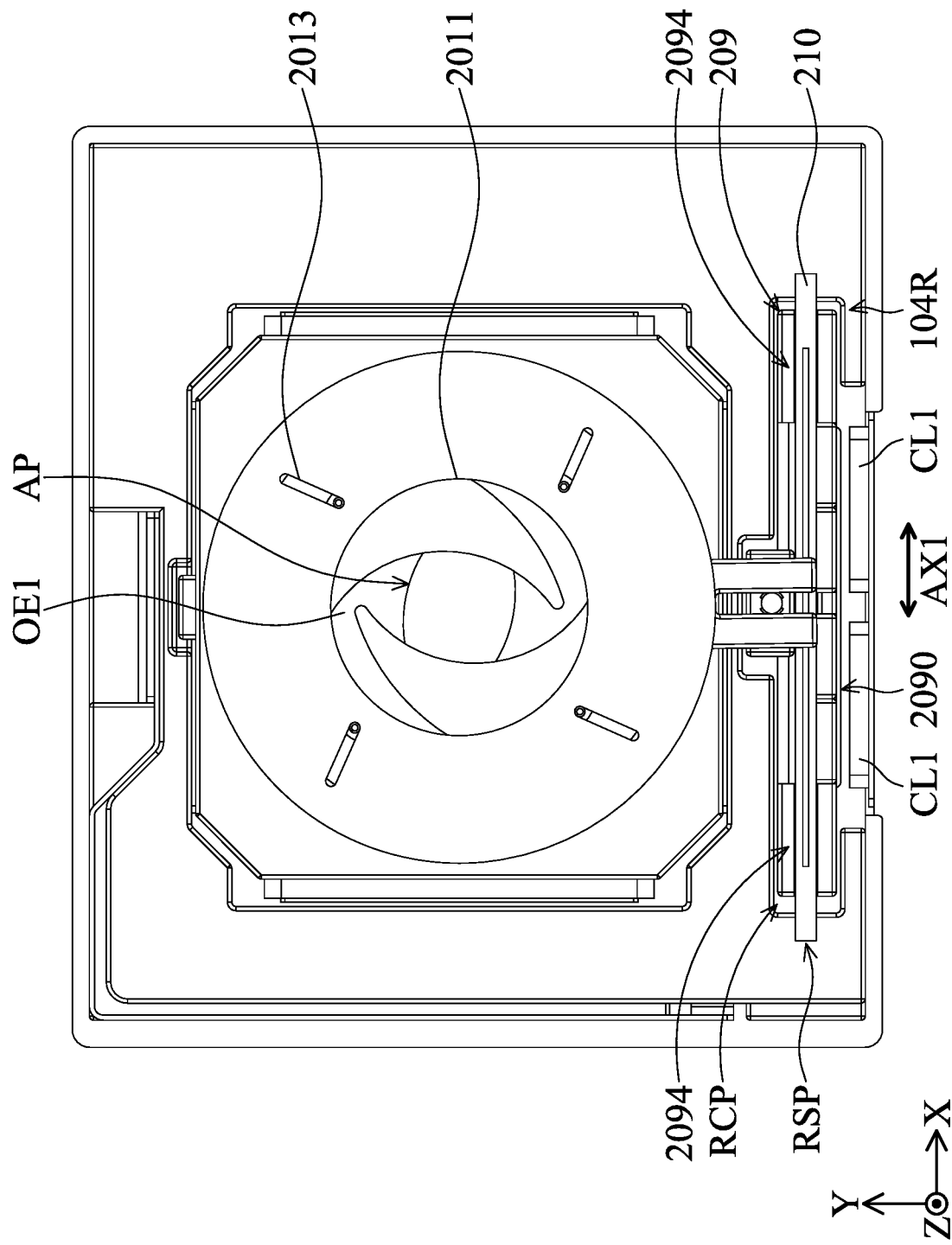
FIG. 8 is a top view of the second movable element 209 in a second extreme position according to an embodiment of the present disclosure.

For example, please refer to FIG. 6 to FIG. 8. FIG. 7 is a top view of the second movable element 209 in a first extreme position according to an embodiment of the present disclosure, and FIG. 8 is a top view of the second movable element 209 in a second extreme position according to an embodiment of the present disclosure. When the two first coils CL1 are energized, the second movable element 209 can be driven to move between the first extreme position and the second extreme position, thereby driving the first optical elements OE1 (the blades) to move, so as to change the amount of light entering the first optical element driving mechanism 200.

For example, as shown in FIG. 7, when the second movable element 209 is in the first extreme position, the first optical elements OE1 are accommodated under the outer shielding member 201, so that the aperture AP of first optical element driving mechanism 200 has the largest size (in some embodiments, the size of the aperture AP may be equal to the size of the first inner opening 2031 at this time). When it is desired to adjust the size of the aperture AP, the second movable element 209 can be driven to move from the first extreme position in FIG. 7 to the position in FIG. 6, so that the four first optical elements OE1 begin to shield the first outer opening 2011, and therefore the aperture AP is gradually narrowed.

Furthermore, as shown in FIG. 8, when the second movable element 209 moves from the position in FIG. 6 to the second extreme position in FIG. 8, the four first optical elements OE1 continue to shield the first outer opening 2011, so that the aperture AP gradually shrinks to a minimum size. Based on the above structural configuration, the size of the aperture AP of the first optical element driving mechanism 200 can be continuously changed, so that the image captured by the optical system 10 can be clearer.

As shown in FIG. 4 and FIG. 6, the second movable element 209 has a second body 2090, and the second body 2090 has a long strip-shaped structure extending along the first axis AX1. When viewed along the main axis MX, the length of the receiving trench 104R in the first axis AX1 is greater than the length of the second body 2090 in the first axis AX1.

The receiving trench 104R has a middle receiving portion RCP and two side receiving portions RSP. The two side receiving portions RSP extend from the middle receiving portion RCP along the first axis AX1. The middle receiving portion RCP is configured to accommodate the second body 2090. Furthermore, the first optical element driving mechanism 200 may further include a blocking member 210 having a long strip-shaped structure extending along the first axis AX1. For example, the blocking member 210 is a cylinder, but it is not limited thereto.

The blocking member 210 is fixedly disposed in the two side receiving portions RSP. For example, the blocking member 210 can be fixed in the two side receiving portions RSP by glue. Furthermore, as shown in FIG. 4, the second movable element 209 further includes two receiving structures 2094 disposed on opposite sides of the second body 2090.

It should be noted that the blocking member 210 is suspended in the two receiving structures 2094. That is, the blocking member 210 is not in contact with the receiving structures 2094, and the blocking member 210 is not in contact with the second body 2090. When the optical system 10 is impacted, the blocking member 210 may be in contact with the second movable element 209 to prevent the second movable element 209 from detaching from the receiving trench 104R.

Figure 9:
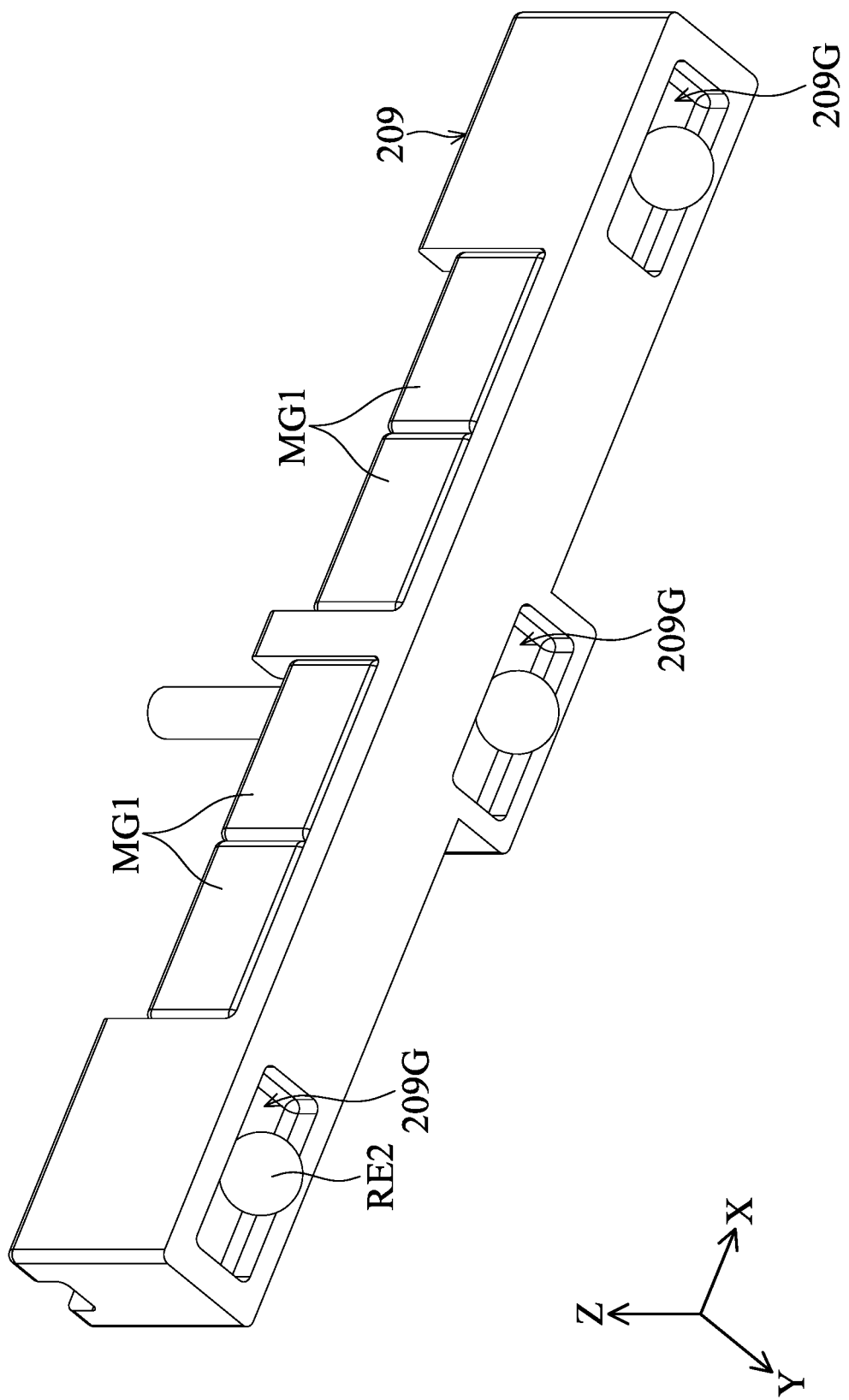
FIG. 9 is a perspective view of the second movable element 209 and the first magnetic elements MG1 according to an embodiment of the present disclosure.
Figure 10:
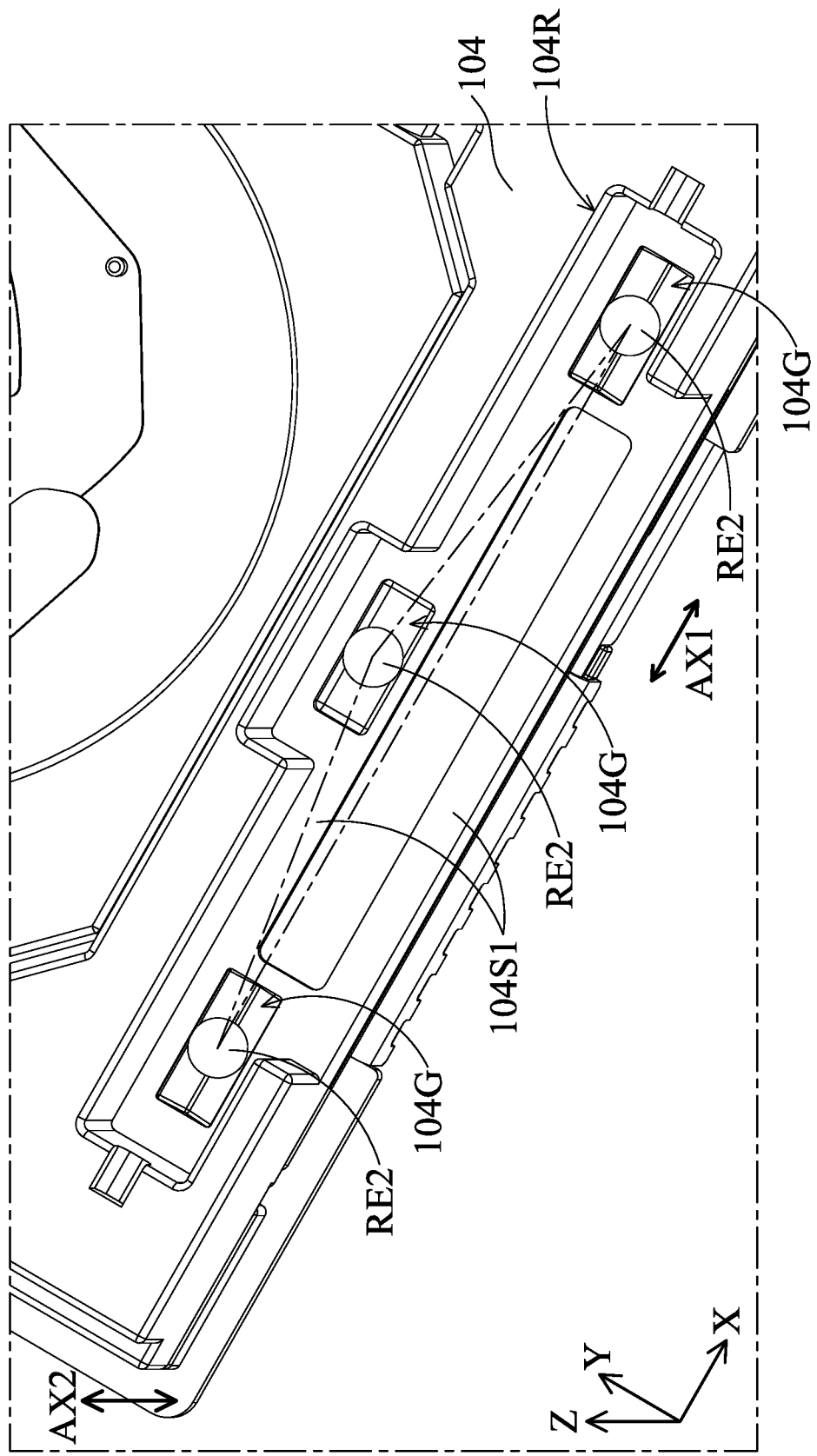
FIG. 10 is an enlarged diagram of the second frame 104 according to an embodiment of the present disclosure.

Please refer to FIG. 9 and FIG. 10. FIG. 9 is a perspective view of the second movable element 209 and the first magnetic elements MG1 according to an embodiment of the present disclosure, and FIG. 10 is an enlarged diagram of the second frame 104 according to an embodiment of the present disclosure. In this embodiment, the second frame 104 of the second movable assembly MA2 further includes at least three receiving grooves 104G extending along the first axis AX1, and the second movable element 209 correspondingly includes at least three receiving grooves 209G.

The first optical element driving mechanism 200 further includes a second rolling assembly RA2 disposed between the second movable element 209 and the second frame 104 of the second movable assembly MA2. Specifically, the second rolling assembly RA2 includes at least three second rolling elements RE2, which are respectively disposed in the at least three receiving grooves 104G and the at least three receiving grooves 209G. Therefore, the second movable element 209 can move along the first axis AX1 with respect to the second frame 104 of the second movable assembly MA2 by the second rolling elements RE2.

As shown in FIG. 10, when viewed along the main axis MX (the second axis AX2), the second rolling elements RE2 may form a triangle, and the triangle is an isosceles triangle, but it is not limited thereto. Furthermore, the receiving grooves 104G are concaved from a receiving surface 10451 in the receiving trench 104R, and the receiving grooves 104G are communicated with the receiving trench 104R.

Please return to FIG. 5. As shown in FIG. 5, the first optical element driving mechanism 200 further includes a first position sensing element SE1 and an electronic element RT, which are disposed on the first circuit assembly 214. One of the two first coils CL1 surrounds the first position sensing element SE1, and the other of the two first coils CL1 surrounds the electronic element RT. The first position sensing element SE1 can be, for example, a Hall sensor, and the electronic element RT can be, for example, a capacitor, but they are not limited thereto.

The first position sensing element SE1 is configured to sense the change of the magnetic field of the first magnetic element MG1 to obtain the position of the second movable element 209. It is worth noting that the first position sensing element SE1 only corresponds to one of the two first magnetic elements MG1. For example, when the second movable element 209 moves and when viewed along the third axis AX3, the first position sensing element SE1 only overlaps one of the two first magnetic elements MG1 and does not overlap the other one of the two first magnetic elements MG1.

Figure 11:
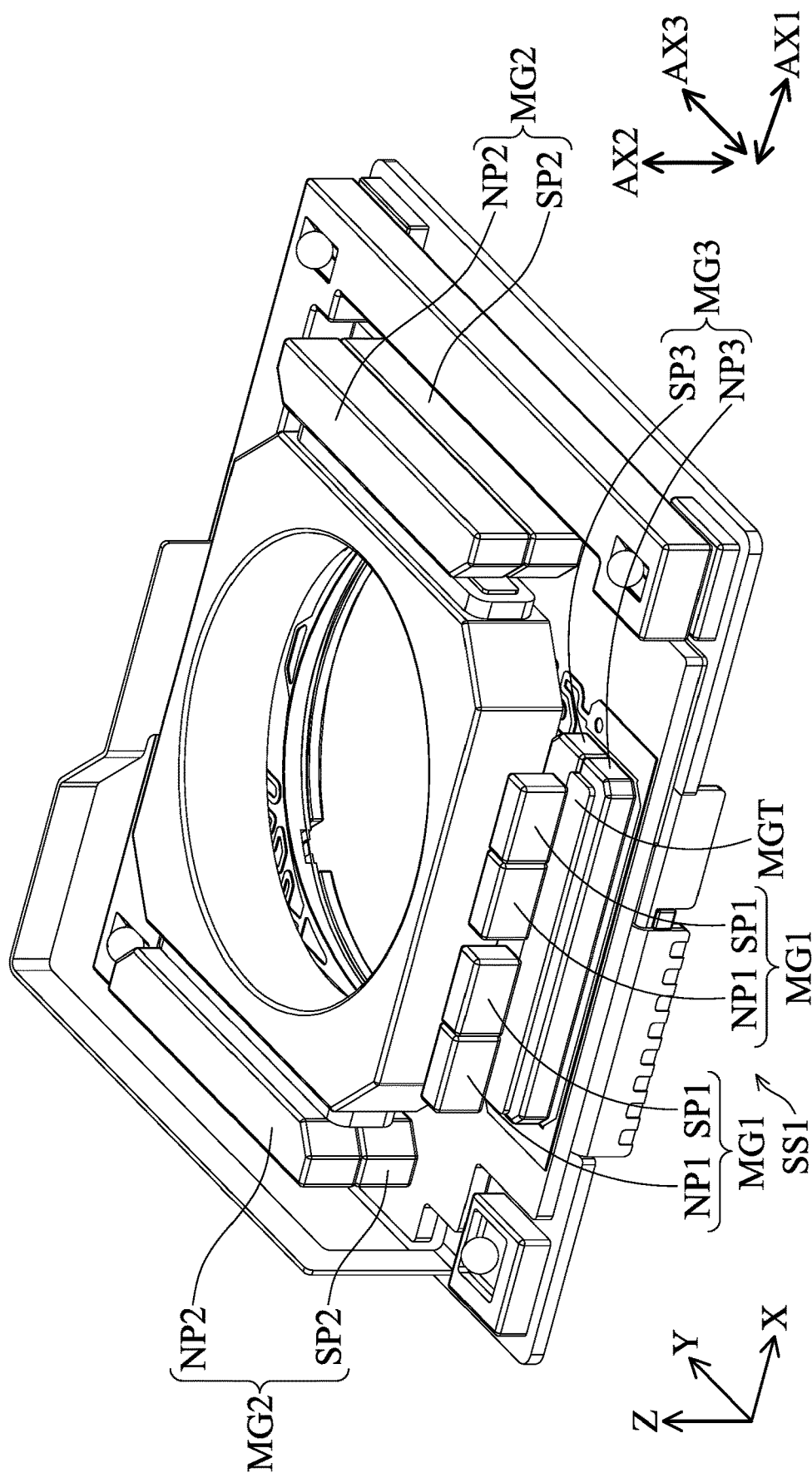
FIG. 11 is a perspective view of a partial structure of the optical system 10 according to an embodiment of the present disclosure.
Figure 12:
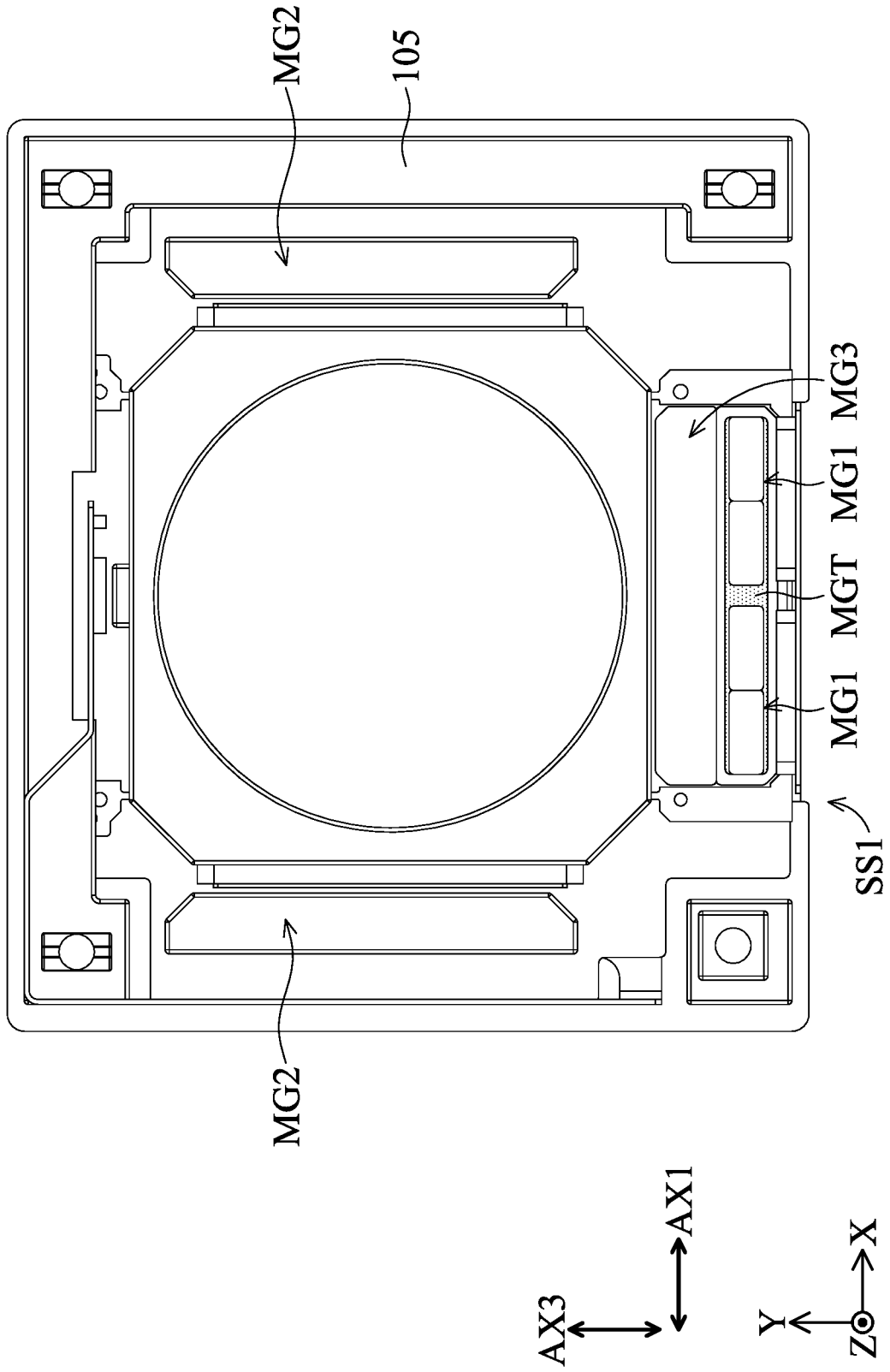
FIG. 12 is a top view of a partial structure of the optical system 10 according to an embodiment of the present disclosure.

Next, please refer to FIG. 11 and FIG. 12. FIG. 11 is a perspective view of a partial structure of the optical system 10 according to an embodiment of the present disclosure, and FIG. 12 is a top view of a partial structure of the optical system 10 according to an embodiment of the present disclosure. In this embodiment, each first magnetic element MG1 includes a first N-pole NP1 and a first S-pole SP1, and the first N-pole NP1 and the first S-pole SP1 are arranged along the first axis AX1.

Furthermore, the two second magnetic elements MG2 and the third magnetic element MG3 are fixedly disposed on the second frame 104. The two second magnetic elements MG2 are arranged along the first axis AX1. Similarly, the second magnetic element MG2 has a second N-pole NP2 and a second S-pole SP2. As shown in FIG. 11, the second N-pole NP2 and the second S-pole SP2 are arranged along the second axis AX2.

The third magnetic element MG3 has a third N-pole NP3 and a third S-pole SP3, and the third N-pole NP3 and the third S-pole SP3 are arranged along the third axis AX3. As shown in the figures, the third magnetic element MG3 is disposed on a first side SS1 of the optical system 10. As shown in FIG. 12, the intermediate bracket 105 has an L-shaped structure, and when viewed along the second axis AX2, the third magnetic element MG3 does not overlap the intermediate bracket 105.

As shown in FIG. 11, the two first magnetic elements MG1, the magnetic member MGT and the third magnetic element MG3 are arranged along the second axis AX2. When viewed along the third axis AX3, the magnetic member MGT is located between the two first magnetic elements MG1 and the third magnetic element MG3.

As shown in FIG. 12, when viewed along the second axis AX2, the two first magnetic elements MG1 overlap at least a portion of the magnetic member MGT. When viewed along the second axis AX2, the two first magnetic elements MG1 completely overlap the magnetic member MGT.

Specifically, when viewed along the second axis AX2, the area of the magnetic member MGT is greater than the total area of the two first magnetic elements MG1. In this embodiment, the magnetic member MGT is made of a magnetic material. Therefore, based on the above-mentioned structural configuration, the problem of magnetic interference between the first magnetic elements MG1 and the third magnetic element MG3 can be effectively reduced.

Figure 13:
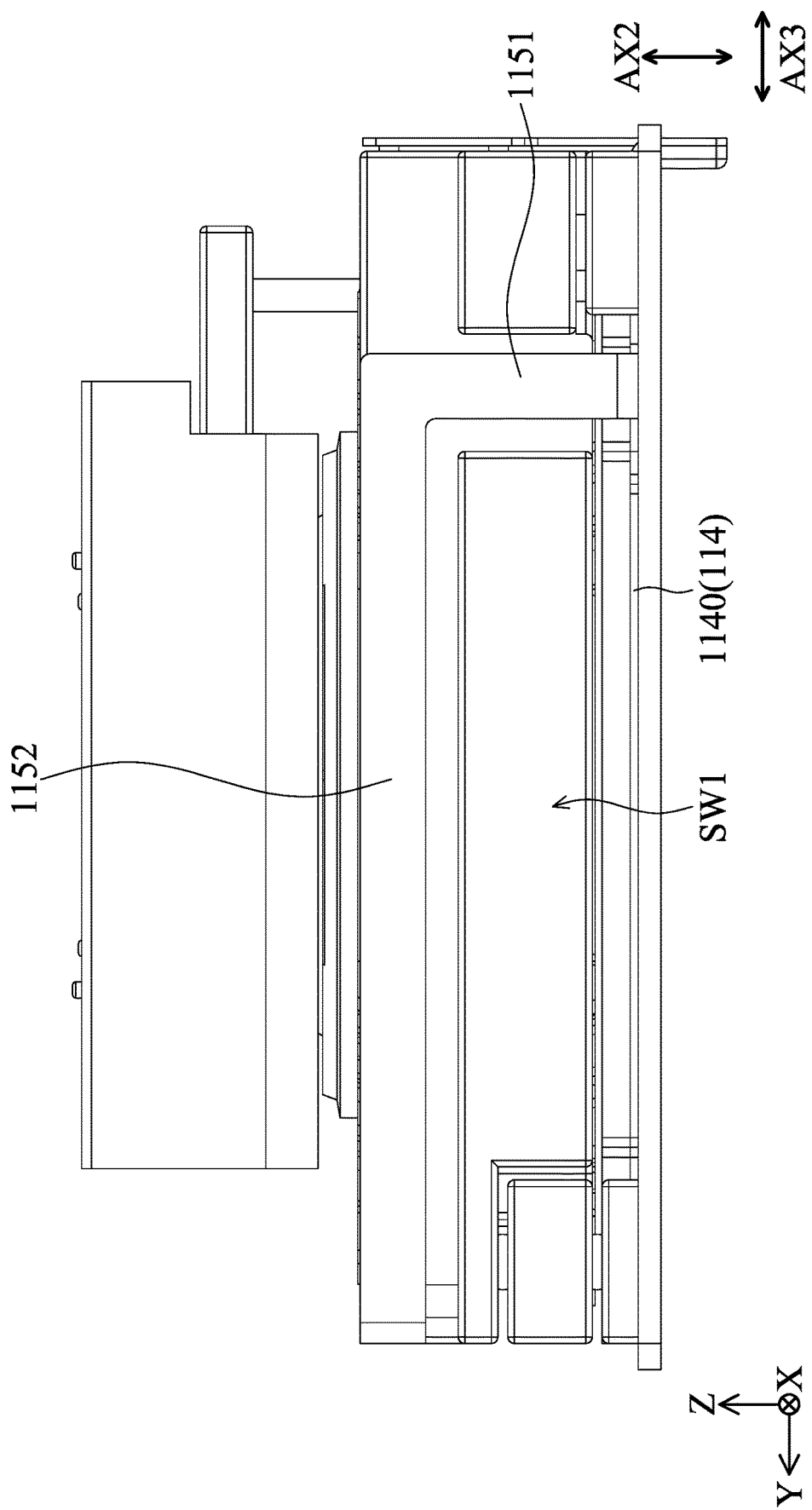
FIG. 13 is a side view of the optical system 10 after removing the casing 102 according to an embodiment of the present disclosure.
Figure 14:
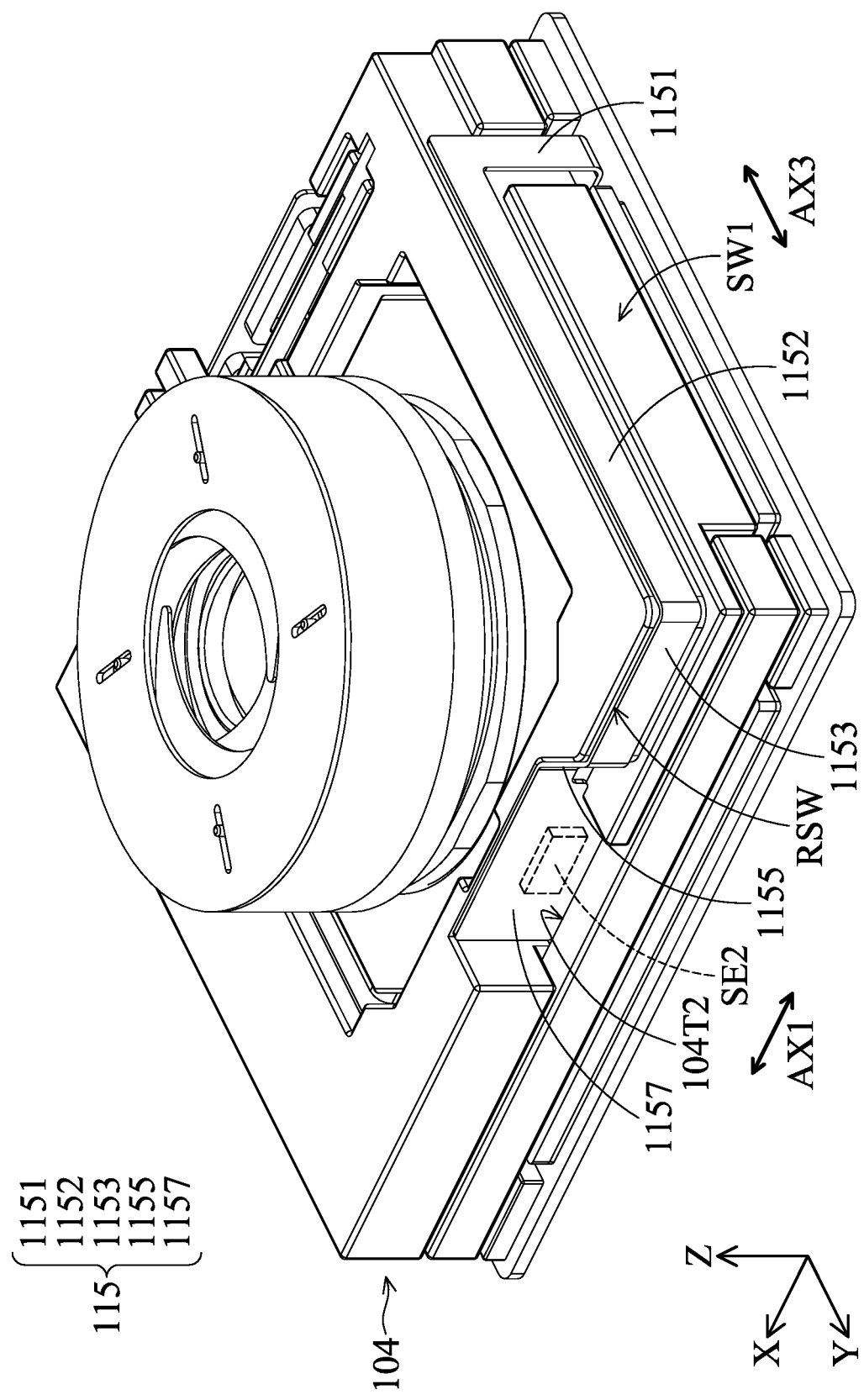
FIG. 14 is a perspective view of the optical system 10 after removing the casing 102 according to an embodiment of the present disclosure.

Please refer to FIG. 6, FIG. 13 and FIG. 14. FIG. 13 is a side view of the optical system 10 after removing the casing 102 according to an embodiment of the present disclosure, and FIG. 14 is a perspective view of the optical system 10 after removing the casing 102 according to an embodiment of the present disclosure. As shown in FIG. 6, when viewed along the second axis AX2 (the Z-axis), the holder 108 has a polygonal structure. For example, the holder 108 is an octagon, but it is not limited thereto.

When viewed along the second axis AX2, the holder 108 has a protruding structure 1083 which protrudes from a side 108S1 of the polygonal structure. An avoiding groove 104A corresponding to the protruding structure 1083 is formed on the second frame 104. The protruding structure 1083 is disposed in the avoiding groove 104A. When viewed along the second axis AX2, the protruding structure 1083 overlaps the avoiding groove 104A. Specifically, the size of the avoiding groove 104A is larger than the size of the protruding structure 1083.

The second circuit assembly 114 is a flexible circuit board, which includes a substrate 1140 and a second circuit element 115, and the substrate 1140 and the second circuit element 115 are integrally formed in one piece. In this embodiment, the second circuit element 115 may include a first extending portion 1151, a second extending portion 1152, a third extending portion 1153, a curved portion 1155 and a second contact portion 1157.

The first extending portion 1151 extends from the substrate 1140 along the second axis AX2. The second extending portion 1152 is connected to the first extending portion 1151, the second extending portion 1152 is connected to the third extending portion 1153, and the extending directions of the second extending portion 1152 and the third extending portion 1153 are different. For example, the second extending portion 1152 extends along the third axis AX3, and the third extending portion 1153 extends along the first axis AX1.

The curved portion 1155 is connected between the second contact portion 1157 and the third extending portion 1153. The extending direction of the curved portion 1155 is different from the extending direction of the second contact portion 1157 and the third extending portion 1153. The second extending portion 1152 is not in contact with a first sidewall SW1 of the second frame 104, the third extending portion 1153 is not in contact with a rear sidewall RSW of the second frame 104, and a portion of the curved portion 1155 is not in contact with the rear sidewall RSW.

The second contact portion 1157 is in contact with the rear sidewall RSW. Specifically, a second slot 104T2 is formed on the rear sidewall RSW, and a portion of the second contact portion 1157 is inserted into the second slot 104T2. Based on the design of the second slot 104T2, the convenience and assembly accuracy of the second circuit assembly 114 to be installed on the second frame 104 can be increased.

A second position sensing element SE2 is disposed on the second contact portion 1157, and the second position sensing element SE2 is electrically connected to the second contact portion 1157 of the second circuit assembly 114. As shown in FIG. 6, when viewed along the main axis MX, the second position sensing element SE2 overlaps the second frame 104.

A sensing magnet MGS is disposed in the protruding structure 1083 of the holder 108, and the sensing magnet MGS corresponds to the second position sensing element SE2. When viewed along the main axis MX, the shortest distance between the second position sensing element SE2 and a side 108S1 of the holder 108 is greater than the shortest distance between the second position sensing element SE2 and the sensing magnet MGS.

Furthermore, when viewed along the main axis MX, the distance between the sensing magnet MGS and the second contact portion 1157 in the third axis AX3 is less than the distance between the sensing magnet MGS and the third extending portion 1153 in the third axis AX3. Based on the above structural configuration, the sensing accuracy of the second position sensing element SE2 can be increased.

Figure 15:
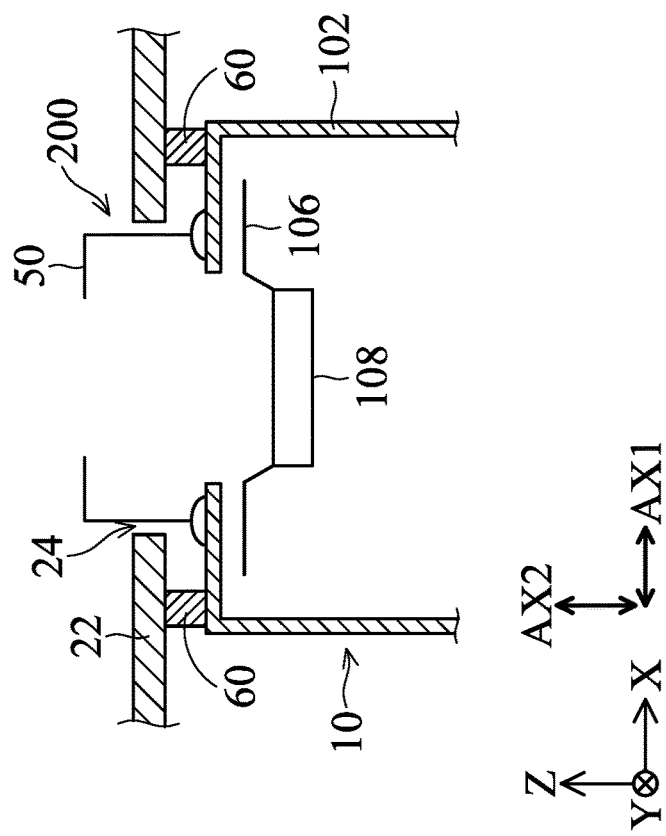
FIG. 15 is a schematic diagram of the optical system 10 disposed on a chassis 22 according to an embodiment of the present disclosure.

Please refer to FIG. 15, which is a schematic diagram of the optical system 10 disposed on a chassis 22 according to an embodiment of the present disclosure. The optical system 10 is configured to be mounted on the chassis 22 of an electronic device along the second axis AX2. The mentioned electronic device is, for example, a smartphone, but it is not limited thereto. The first optical element driving mechanism 200 further includes a protecting cover 50 configured to cover the casing 102.

The protecting cover 50 is connected to the casing 102. For example, the protecting cover 50 is welded or adhered to the casing 102, but it is not limited thereto. In other embodiments, the protecting cover 50 may be connected to the casing 102 by soldering. As shown in figures, the chassis 22 has an outer opening 24, and the protecting cover 50 is inserted into the outer opening 24. That is, the protecting cover 50 protrudes from the outer opening 24 to the outside of the chassis 22.

When viewed along first axis AX1, the chassis 22 overlaps a portion of protecting cover 50. When viewed along the first axis AX1, the chassis 22 overlaps a portion of the first optical element driving mechanism 200. The protecting cover 50 can protect the elements within the first optical element driving mechanism 200 from damage due to collision.

When viewed along the first axis AX1, the chassis 22 does not overlap the casing 102. The optical system 10 further includes a cushion 60 disposed between the chassis 22 and the casing 102. The cushion 60 can be, for example, a sponge, but it is not limited thereto. Based on the design of the cushion 60, it can ensure that when the aforementioned electronic device is impacted, the optical system 10 does not collide with the chassis 22 and cause damage.

Figure 16:
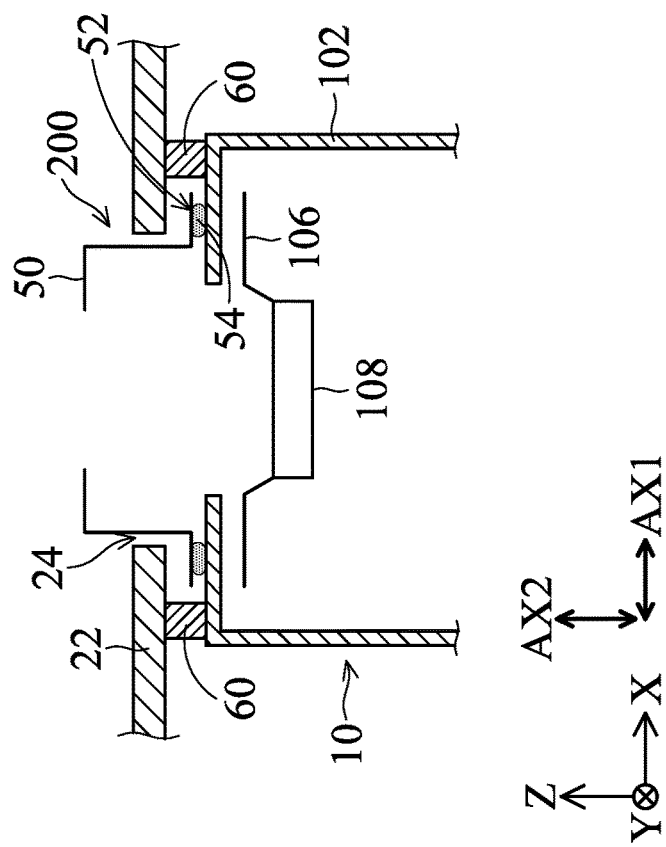
FIG. 16 and FIG. 17 are schematic diagrams of the optical system 10 disposed on the chassis 22 according to different embodiments of the present disclosure.
Figure 17:
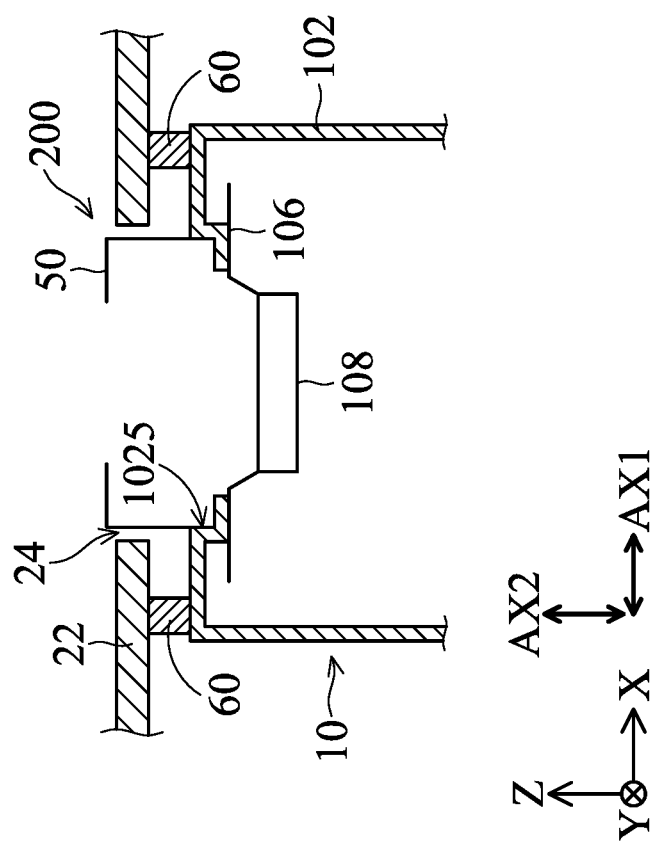

Please refer to FIG. 16 and FIG. 17. FIG. 16 and FIG. 17 are schematic diagrams of the optical system 10 disposed on the chassis 22 according to different embodiments of the present disclosure. As shown in FIG. 16, a flange 52 may be formed on the bottom of the protecting cover 50 and configured to be connected to the casing 102 by the glue 54. Based on the design of the flange 52, the bonding area can be increased, thereby increasing the connection strength between the protecting cover 50 and the casing 102.

Furthermore, as shown in FIG. 17, the casing 102 may have a recessed structure 1025 configured to accommodate a portion of the protecting cover 50. Specifically, when viewed along the first axis AX1, the casing 102 overlaps a portion of the protecting cover 50. Based on the above structural design, the height of the optical system 10 in the Z-axis direction can be further reduced, thereby achieving the purpose of miniaturization.

In conclusion, the present disclosure provides an optical system 10 including a first optical element driving mechanism 200 and a second optical element driving mechanism 100. The first optical element driving mechanism 200 may serve as an aperture mechanism, configured to adjust the amount of light entering the optical system 10. The second optical element driving mechanism 100 can achieve the functions of auto-focusing (AF) and optical image stabilization (OIS).

In some embodiments, when the second movable element 209 is driven to move along the first axis AX1, the driving member 211 is configured to be in contact with the clamping portion 2082 to drive the first movable element 208 to rotate around the main axis MX, thereby drive the first optical elements OE1 to adjust the size of the aperture. It is worth noting that, the second movable element 209 is disposed in the second frame 104 of the second optical element driving mechanism 100, so the purpose of miniaturization can be achieved. Furthermore, based on the configurations of the second movable element 209, the driving member 211 and the first movable element 208, the size of the aperture of the first optical element driving mechanism 200 can be continuously changed.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical system, comprising:
a first optical element driving mechanism, which comprises:
a first fixed assembly;
a first movable assembly, configured to be connected to a first optical element, wherein the first movable assembly is movable relative to the first fixed assembly, and the first movable assembly comprises a first movable element and a second movable element; and
a first driving assembly, configured to drive the first movable assembly to move relative to the first fixed assembly;
wherein the first fixed assembly and the first movable assembly are arranged along a main axis, and when viewed along the main axis, a portion of the first movable element overlaps the second movable element;
the optical system further comprises a second optical element driving mechanism;
the first optical element driving mechanism is disposed on the second optical element driving mechanism;
the second optical element driving mechanism comprises a second movable assembly, configured to be connected to a second optical element;
the second movable assembly has a receiving trench extending along a first axis;
the second movable element is disposed in the receiving trench;
the second movable element is configured to move along the first axis in the receiving trench;
wherein the second movable assembly covers a portion of the second movable element;
the first optical element driving mechanism further comprises a second rolling assembly disposed between the second movable element and the second movable assembly; and
the second movable element, the second rolling assembly, and the second movable assembly are sequentially arranged along the main axis.

2. The optical system as claimed in claim 1, wherein the second optical element driving mechanism further comprises:
a second fixed assembly;
and a second driving assembly, configured to drive the second movable assembly and the second optical element to move relative to the second fixed assembly.

3. The optical system as claimed in claim 2, wherein the second fixed assembly comprises:
a casing; and
a second base,
wherein the casing is affixed to the second base to form an accommodation space;
the accommodation space is configured to accommodate the second movable assembly and the second driving assembly;
the casing surrounds a portion of the first optical element driving mechanism;
the first movable element is rotatable around the main axis;
the second movable element is movable along the first axis; and
the first axis is perpendicular to the main axis.

4. The optical system as claimed in claim 3, wherein
the optical system is configured to be mounted on a chassis of an electronic device along a second axis;
the second axis is parallel to the main axis;
the second axis is perpendicular to the first axis;
the first optical element driving mechanism further comprises a protecting cover configured to cover the casing; and
the protecting cover is connected to the casing.

5. The optical system as claimed in claim 4, wherein
the protecting cover is welded or adhered to the casing; and
the chassis has an outer opening, and the protecting cover is inserted into the outer opening.

6. The optical system as claimed in claim 5, wherein
when viewed along the first axis, the chassis overlaps a portion of the protecting cover;
when viewed along the first axis, the chassis overlaps a portion of the first optical element driving mechanism;
when viewed along the first axis, the wall of the chassis with the outer opening does not overlap the casing; and
when viewed along the first axis, the casing overlaps a portion of the protecting cover.

7. The optical system as claimed in claim 6, wherein
the optical system further comprises a cushion disposed between the chassis and the casing; and
the cushion comprises a sponge.

8. The optical system as claimed in claim 2, wherein
the second movable assembly further comprises at least three receiving grooves, extending along the first axis;
the second rolling assembly comprises at least three second rolling elements, which are respectively disposed in the at least three receiving grooves; and
the second movable element moves along the first axis relative to the second movable assembly by the at least three second rolling elements.

9. The optical system as claimed in claim 8, wherein
when viewed along the main axis, the at least three second rolling elements form a triangle;
the triangle is an isosceles triangle;
the first driving assembly comprises two first magnetic elements fixedly disposed on the second movable element;
the two first magnetic elements are arranged along the first axis;
the first magnetic element comprises a first N-pole and a first S-pole; and
the first N-pole and the first S-pole are arranged along the first axis.

10. The optical system as claimed in claim 9, wherein
the second optical element driving mechanism further comprises a magnetic member disposed in the receiving trench;
in the second axis, the second movable element is located between the two first magnetic elements and the magnetic member; and
a magnetic attraction force is generated between the two first magnetic elements and the magnetic member, so that the second movable element does not separate from the receiving trench.

11. The optical system as claimed in claim 10, wherein
the second movable assembly comprises a second frame and an intermediate bracket;
the second optical element driving mechanism further comprises a third rolling assembly;
the second frame is moved along a third axis relative to the intermediate bracket by the third rolling assembly;
the intermediate bracket and the second frame are moved along the first axis relative to the second base by the third rolling assembly; and
the third axis is perpendicular to the first axis and the second axis.

12. The optical system as claimed in claim 11, wherein
the second driving assembly comprises two second magnetic elements and a third magnetic element, fixedly disposed on the second frame;
the two second magnetic elements are arranged along the first axis;
the second magnetic element has a second N-pole and a second S-pole;
the second N-pole and the second S-pole are arranged along the second axis;
the third magnetic element has a third N-pole and a third S-pole;
the third N-pole and the third S-pole are arranged along the third axis;
the third magnetic element is disposed on a first side of the optical system;
the intermediate bracket has an L-shaped structure; and
when viewed along the second axis, the third magnetic element does not overlap the intermediate bracket.

13. The optical system as claimed in claim 12, wherein
the two first magnetic elements, the magnetic member and the third magnetic element are arranged along the second axis;
when viewed along the third axis, the magnetic member is located between the two first magnetic elements and the third magnetic element;
when viewed along the second axis, the two first magnetic elements overlap at least a portion of the magnetic member; and
when viewed along the second axis, the two first magnetic elements completely overlap the magnetic member.

14. The optical system as claimed in claim 13, wherein
the first optical driving mechanism further comprises a first circuit assembly fixedly disposed on the casing;
when viewed along the third axis, the first circuit assembly has an L-shaped structure;
the first driving assembly further comprises two first coils corresponding to the two first magnetic elements;
the two first coils are fixedly disposed on the first circuit assembly;
the two first coils are arranged along the first axis; and
when viewed along the second axis, the two first coils overlap the second frame.

15. The optical system as claimed in claim 14, wherein
the second optical element driving mechanism further comprises a holder, a first elastic element and a second elastic element;
the holder is configured to hold the second optical element;
the holder is suspended in the second frame by the first elastic element and the second elastic element; and
when viewed along the second axis, the holder has a polygonal structure.

16. The optical system as claimed in claim 15, wherein
when viewed along the second axis, the holder has a protruding structure which protrudes from a side of the polygonal structure;
an avoiding groove corresponding to the protruding structure is formed on the second frame;

the protruding structure is disposed in the avoiding groove;

when viewed along the second axis, the protruding structure overlaps the avoiding groove; and a size of the avoiding groove is larger than a size of the protruding structure.

17. The optical system as claimed in claim 16, wherein the second optical driving mechanism further comprises a second circuit assembly electrically connected to the second driving assembly;

the second circuit assembly comprises a substrate and a second circuit element;

the second circuit element comprises a first extending portion, a second extending portion, a third extending portion, a curved portion and a second contact portion;

the first extending portion extends from the substrate along the second axis;

the second extending portion is connected to the first extending portion;

the second extending portion is connected to the third extending portion;

extending directions of the second extending portion and the third extending portion are different;

the curved portion is connected between the second contact portion and the third extending portion; and an extending direction of the curved portion is different from an extending direction of the second contact portion and the third extending portion.

18. The optical system as claimed in claim 17, wherein the second extending portion is not in contact with a first sidewall of the second frame;

the third extending portion is not in contact with a rear sidewall of the second frame;

a portion of the curved portion is not in contact with the rear sidewall;

the second contact portion is in contact with the rear sidewall; and a second slot is formed on the rear sidewall, and a portion of the second contact portion is inserted into the second slot.

19. The optical system as claimed in claim 18, wherein a second position sensing element is disposed on the second contact portion;

the second position sensing element is electrically connected to the second contact portion; and when viewed along the main axis, the second position sensing element overlaps the second frame.

20. The optical system as claimed in claim 19, wherein a sensing magnet is disposed in the protruding structure of the holder, and the sensing magnet corresponds to the second position sensing element;

when viewed along the main axis, a shortest distance between the second position sensing element and the side of the holder is greater than a shortest distance between the second position sensing element and the sensing magnet; and when viewed along the main axis, a distance between the sensing magnet and the second contact portion in the third axis is less than a distance between the sensing magnet and the third extending portion in the third axis.

\* \* \* \* \*